United States Patent [19]

Celenza et al.

[11] Patent Number: 5,049,805

[45] Date of Patent: Sep. 17, 1991

[54] VOLTAGE SENSITIVE SWITCH

[75] Inventors: Nicholas Celenza, Durham; Raymond M. Clemo; Ronald S. Jungling, both of Raleigh; Brian D. Miller, Durham, all of N.C.

[73] Assignee: International Business Machines Corporation, Armonk, N.Y.

[21] Appl. No.: 529,030

[22] Filed: May 25, 1990

[51] Int. Cl.⁵ .............................................. G05F 1/56
[52] U.S. Cl. .................................. 323/285; 323/266; 363/89; 307/66; 307/87
[58] Field of Search ............... 323/282, 283, 284, 285, 323/266, 271; 307/64, 66, 85, 86, 87; 363/89

[56] References Cited

U.S. PATENT DOCUMENTS

| | | | |
|---|---|---|---|
| 3,754,182 | 8/1973 | Morris et al. | 323/285 |
| 4,327,298 | 4/1982 | Burgin | 307/66 |
| 4,788,450 | 11/1988 | Wagner | 307/66 |
| 4,841,160 | 6/1989 | Yon et al. | 307/87 |
| 4,857,756 | 8/1989 | Haneda | 307/64 |

Primary Examiner—Peter S. Wong
Attorney, Agent, or Firm—Joscelyn G. Cockburn

[57] ABSTRACT

An apparatus which connects/disconnects battery from a load such as a computer system includes a first circuit arrangement which sets a first reference voltage level at which the energy source is connected through an FET device to the computer system, a second circuit arrangement that sets a second voltage level at which the energy source is disconnected by the FET device from the computer system and a third circuit arrangement which controls the FET device so that said FET device is forced into either its ON or OFF state once one of the reference voltages is reached. A second apparatus which reduces power dissipation in a battery charger power device by forcing the input voltage to track the battery voltage as the battery charges/discharges.

13 Claims, 3 Drawing Sheets

VOLTAGE SENSITIVE SWITCH

BACKGROUND OF THE INVENTION

1. Field of the Invention

The present invention relates to power systems in general and in particular to power systems that include stand-by batteries and connect/disconnect devices.

2. Prior Art

Most electrical equipment is powered from a power supply connected to main power lines. This equipment is subjected to intermittent loss of power caused by someone unplugging the power supply cord from the power outlet or during service interruption or power outages. There are several types of electrical equipment and appliances which require continuous power.

An acceptable way of providing continuous power is to include a battery in the power supply system. The battery is charged when the main power is operational. However, in the event of a power outage, the power is supplied from the battery. When a battery is used as a stand-by power source, one has to ensure that the battery is not deep discharged (i.e., discharged below a predetermined voltage level). If one deep discharges a battery, the life of the battery is greatly reduced.

It is known in the prior art to connect the battery via a switching mechanism to a load. In the event the battery is discharged to a predetermined voltage level, the switching mechanism is activated to disconnect the load and prevent the battery from deep discharging. Prior art examples of stand-by power supplies with switching mechanisms which disconnect the battery are set forth in U.S. Pat. No. 4,704,542, JP55-76578(A), Appl. No. 53-150695 entitled "Over Discharge Preventing Circuit for Battery" to Anritsu Denki et al and German patent DT 2732-794. Still other prior art circuits and techniques use a positive feedback resistor connected between the load and a trigger transistor to connect/disconnect the battery.

Even though the prior art circuits work well for their intended purposes, they do not switch instantaneously. As a result, even after switching, the battery still continues to discharge through circuitry load. The continued discharge below the threshold voltage level tends to damage and reduce the life of the battery. Also, the period of indecision occurring between activating of the switching circuit and when it finally switches, causes electrical noise in the load. There are certain types of load (e.g., computer systems) which are very sensitive to electrical voltage noise. Because of the noise, the prior art switching systems are not well suited for noise sensitive loads.

SUMMARY OF THE PRESENT INVENTION

It is a general object of the present invention to provide a more efficient auxiliary power system than has heretofore been possible.

It is another object of the present invention to provide a more efficient battery charger system.

It is another object of the present invention to provide a voltage sensitive switch that disconnects the auxiliary power system from its load instantaneously.

It is another object of the present invention to provide a switch that is less noisy than has heretofore been possible.

The above and other objects are achieved by an auxiliary power system including a battery whose output node is coupled to a battery charge circuit and a deep discharge prevention circuit. The deep discharge circuit includes a large gain hysteresis circuit that forces an FET device to switch instantaneously once a preset turn-on/turn-off voltage level is reached. The battery charge circuit includes a series pass transistor with a feedback loop that maintains a constant voltage drop across the transistor and, as such, minimizes the power consumption in the series pass transistor.

More particularly, the deep discharge prevention circuit is a voltage sensitive switch which includes an FET device with its source terminal coupled to the battery. A circuit arrangement (CR1, R6) which sets the turn-on voltage level, interconnects the source terminal to the base of transmitter (Q4) whose emitter is returned to ground potential. A circuit arrangement (CR2, R8), sets the turn-off voltage level, interconnects the drain terminal of Q5 to the base of Q4. A circuit arrangement R10 assures that Q5 (a p-channel FET) is turned off when Q4 is off. The zenner voltage of CR1 is chosen higher than that of CR2, and it is chosen also such that when the battery voltage reaches proper potential, CR1 starts conduction. This, in turn, turns on Q4 which, in turn, turns on Q5. With Q5 on, CR2 turns on and latches Q4 on. As the battery voltage drops due to discharge, CR1 turns off, but CR2 remains on until the battery voltage approaches the deep discharge level, then CR2 turns off, which causes Q4 to turn off, which causes Q5 to turn off, which causes CR2 to latch off.

Likewise, the battery charger circuit receives a rectified, step-down DC voltage which is generated from an AC power supply main. The output of the battery charger circuit is coupled by a series pass transistor device whose emitter electrode is coupled to the positive terminal of the battery. A feedback loop including an active device interconnects the positive terminal of the battery to the collector terminal of the transistor. Thus, as the voltage at the positive terminal of the battery charges the voltage on the emitter electrode also increases and the voltage on the collector electrode follows suit. Because the voltage on the collector electrode of the transistor is adjusted for changes on the emitter electrodes, power dissipation across the transistor is reduced.

The foregoing features and advantages will now be more fully described with reference to the accompanying drawings.

DESCRIPTION OF THE PREFERRED EMBODIMENT

Figure 1:
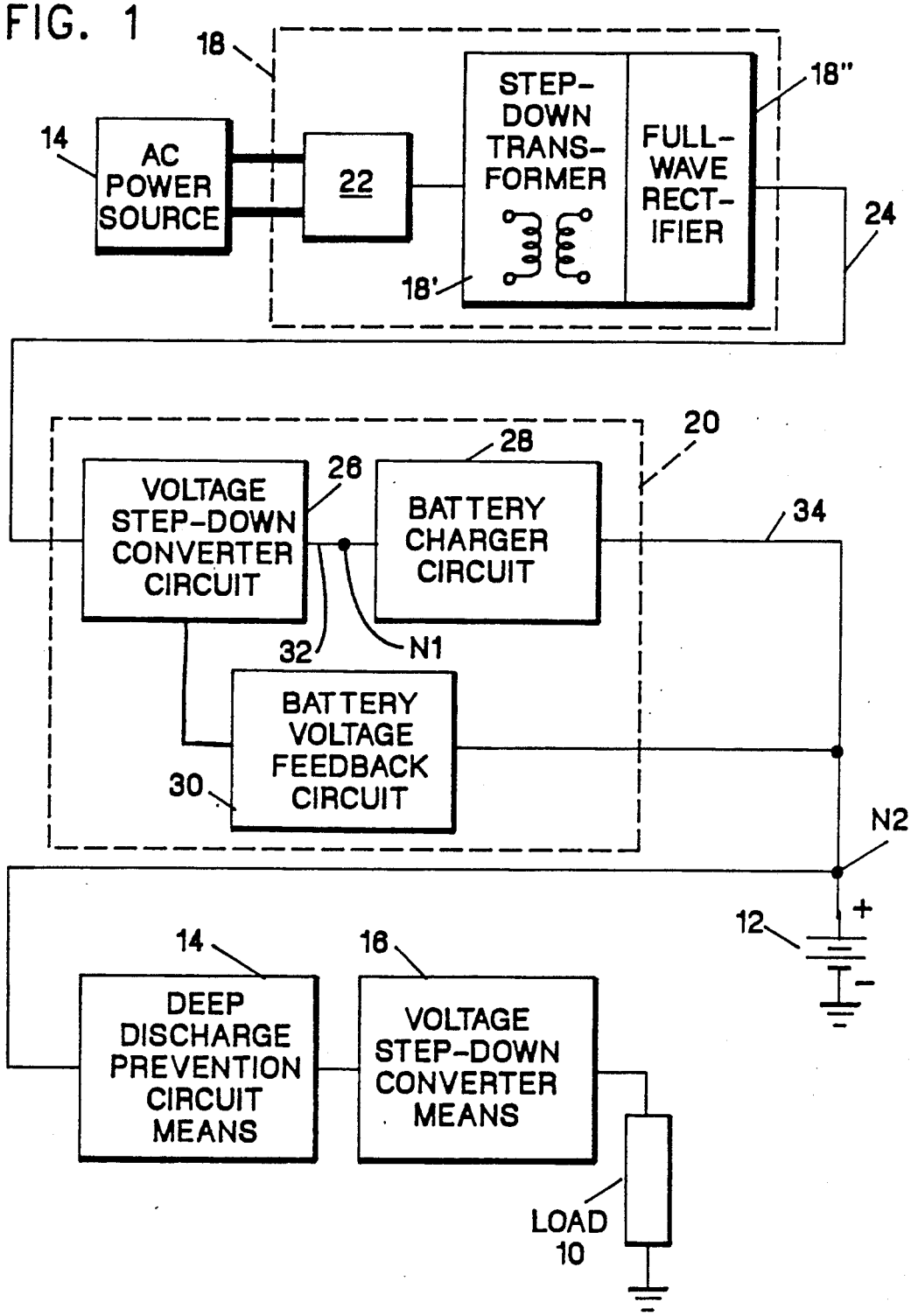
FIG. 1 shows a schematic of an improved power system.

FIG. 1 shows an improved power system that provides energy to a load 10. Preferably, the load is one that requires low voltage such as a computer system or the like. The IBM 4683 Point-of-Sale System is an example of a low voltage load that could be coupled to the power system. The IBM 4683 Point-of-Sale system is a computer system that is used in several types of business establishments. The improved power system includes a battery 12 which provides stand-by power in the event that the AC voltage from AC power source 14 is disrupted. Preferably, the battery is a sealed lead acid battery such as Panasonic PN LCL12V24P. Of course, other types of similar batteries could be used without deviating from the scope or spirit of the present invention.

The positive terminal of battery 12 is connected to node N2. Node N2 is connected by deep discharge prevention circuit means 15 to a voltage step-down converter means 16. As stated previously, the battery 12 is subject to damage if discharged below a preset voltage level. The function of the deep discharge prevention circuit means 15 is to disconnect battery 12 from load 10 when the voltage level at node N2 reaches the preset level. The voltage step-down circuit means 16 is a DC-to-DC converter circuit which accepts the voltage from the deep discharge prevention circuit means 15 and generates a voltage whose level is compatible with the requirements of load 10. In case load 10 is a computer system, the output voltage from the voltage step-down converter means 16 is within the range of 5 volts.

Still referring to FIG. 1, the improved power system includes a conventional power supply 18 and a battery charging generating means 20. The power supply 18 is connected through a connector plug assembly 22 to AC power source 14. The conventional power supply 18 accepts at its input an AC line voltage and generates a DC voltage on conductor 24. In the preferred embodiment of the invention, the DC voltage on line 24 is within the range of 22-34 volts DC. The conventional power supply 18 comprises a step-down transformer means 18' and full wave rectifier means 18". Because the use of a step-down transformer and a full wave rectifier, for generating a desired DC voltage, is well known in the prior art technology, further description of the power supply 18 will not be given.

Still referring to FIG. 1, the battery charging generating means 20 includes a voltage step-down converter circuit means 26, battery charge circuit means 28 and battery feedback circuit means 30. The details of each of these components will be given subsequently. Suffice it to say at this point that the voltage step-down converter 26 accepts a DC voltage on conductor 24 and generates a lower voltage which is supplied on conductor 32. In the preferred embodiment of this invention, the voltage on conductor 32 is within the range of from 12-16.3 volts DC. Similarly, the battery charge circuit 28 accepts the voltage on conductor 32 and generates a lower voltage which is outputted on conductor 34. The voltage on conductor 34 is substantially equivalent to the voltage on battery 12. In the preferred embodiment of this invention, the voltage at node N2 is within the range of from 11.4 volts to 14.7 volts DC. Since the voltage at node N2 varies within a relatively wide range, the battery voltage feedback circuit means 30 adjusts the voltage on node N1 relative to a reference voltage (to be described subsequently) in the step-down converter 26. As a result of the battery voltage feedback circuit means 30, the energy dissipation in the battery charger is significantly reduced.

Figure 2:
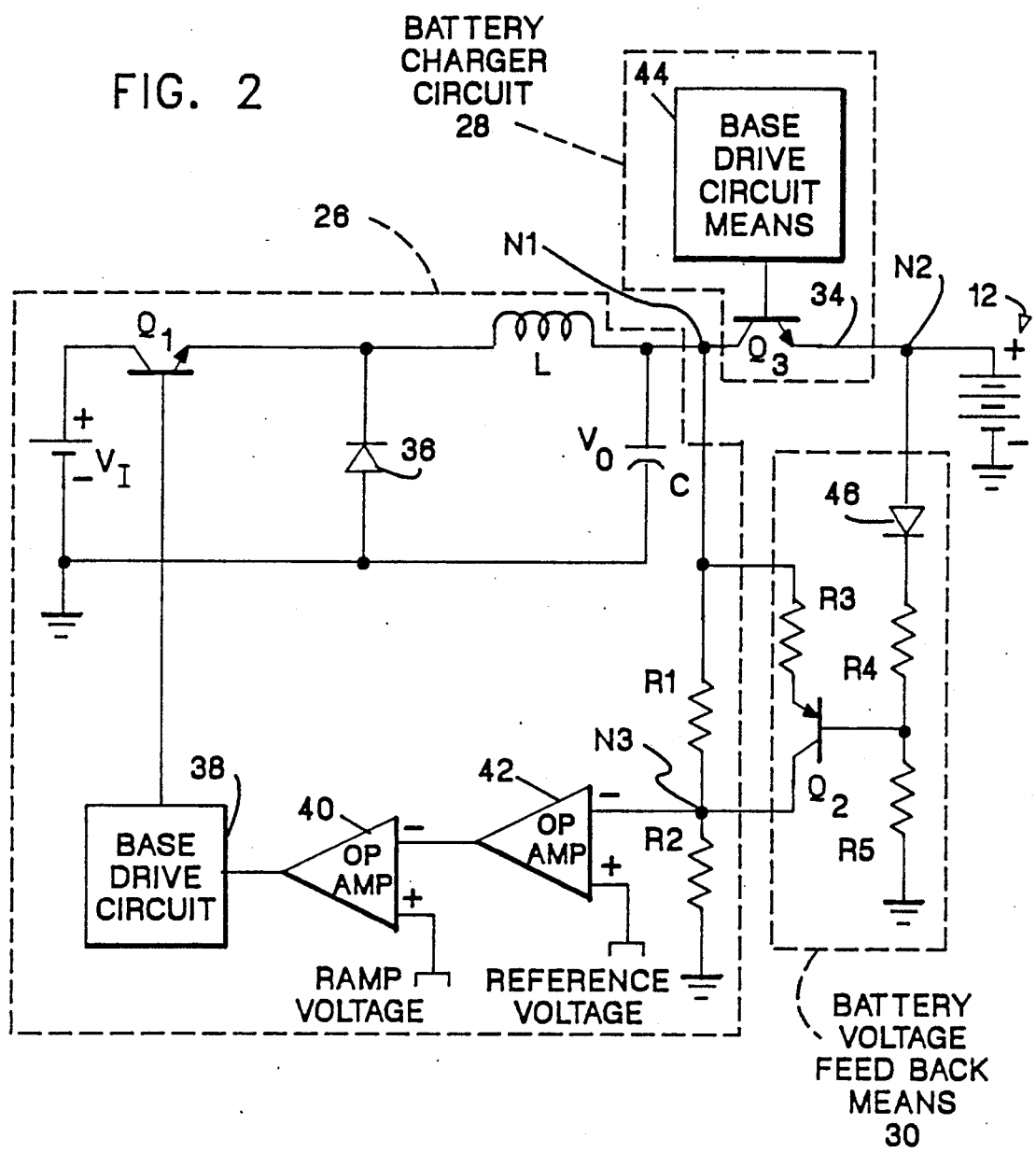
FIG. 2 shows a circuit schematic of an improved step-down and battery charging circuit arrangement.

FIG. 2 shows a circuit schematic for battery charger circuit means 28. For simplicity, elements which are common to FIG. 1 are labeled with the same numeral. It should be noted that the DC supply voltage $V_I$ is a symbolic representation of the DC voltage which is generated on conductor 24 (FIG. 1). The voltage step-down converter 26 is a DC to DC converter. This type of voltage converter is well known in the prior art.

Essentially, an output voltage $V_o$ is generated from an input voltage $V_I$. $V_o$ is inherently less than $V_I$. The output voltage $V_o$ is generated on capacitor C. The positive plate of capacitor C is tied to node N1. Thus, whatever voltage is on capacitor C is also present at node N1. Node N1 is connected to ground potential through series connected resistors R1 and R2. A transistor Q1 has it emitter connected via coil L to the positive plate of capacitor C and through diode 36 to the negative plate of capacitor C. The collector terminal of transistor Q1 is coupled to the DC voltage $V_I$ and the base terminal of transistor Q1 is coupled through base drive circuit 38 operational amplifiers 40 and 42 to node N3.

Still referring to FIG. 2, the battery charge circuit 28 includes series pass device Q3 and base drive circuit means 44. Even though Q3 can be an FET device, in the preferred embodiment of this invention, Q3 is a bi-polar transistor. The emitter electrode of Q3 is connected via conductor 34 to node N2. The collector electrode of Q3 is connected to node N1 and the base electrode of Q3 is connected to base drive circuit means 44. The series pass device Q3 accepts an input voltage on node N1 and provides a regulated output current to node N2. As stated previously, the step-down converter circuit 26 is a DC to DC converter which provides an output voltage $V_o$ which is approximately 16.3 volts on node N1. The battery charger circuit 28 uses the voltage on N1 as its input and charges the battery which is connected to node N2 to a voltage which varies from say 11.4 volts to 14.7 volts depending upon the charge level of battery 12. At full charge, Q3 charges the battery with a constant current, say of 1.5 amps. The power dissipated in Q3 without and with the battery voltage feedback circuit is as follows:

Power dissipated in $Q3$ = voltage across $Q3$ (collector to emitter) × $Q3$ current is without the battery voltage feedback circuit 30, Power dissipated in $Q3$ = (16.3 − 11.4)v × 1.5A = 7.4 watts without the battery voltage feedback circuit 30, Power dissipated in $Q3$ = (16.3 − 14.7)v × 1.5A =
2.4 watts max
= (12.0 − 11.4)v × 1.5A =
0.9 watts min.

As can be seen from the above equations, the power dissipated in Q3 without the battery voltage feedback circuit 30 is 7.4 watts. This large power dissipation in Q3 is undesirable. Therefore, without the inclusion of battery voltage feedback circuit means 30 (to be described subsequently) Q3 would have to be selected and provided with heat sinks which is able to handle the maximum power 7.4 watts. Moreover, this amount of power dissipation would require an expensive transistor device and sinks and may even require the use of fans, etc., for cooling purposes. The unnecessary expenses and design limitations are averted by the battery voltage feedback circuit means 30 which will now be described.

Referring again to FIG. 2, the battery voltage feedback circuit means 30 samples the voltage at node N2 and adjusts the input voltage at N1 accordingly. Thus, the power dissipation across Q3 is significantly reduced and over design of the transistor and related components are avoided. The battery feedback circuit means 30 includes transistor Q2 with its base terminal connected through R5 to ground potential. Similarly, the base electrode of Q2 is coupled by series connected diode 46 and resistor R4 to node N2. The emitter of transistor Q2 is coupled through R3 to node N1. The collector of transistor Q2 is connected to node N3.

In operation, R1 and R2 form a voltage divider such that the voltage across R2 is approximately equal to the reference voltage on the positive input of op amp 42. The control circuit (including op amp 40 with its ramp voltage on the positive terminal and base drive circuit 38) adjusts the duty cycle of transistor Q1 and thus, $V_o$ in an effort to maintain the two inputs of op amp 42 approximately equal. Since the reference voltage on the positive terminal of op amp 42 is constant and R1 and R2 are constant, the output voltage $V_o$, at node N1, would also remain approximately constant. However, resistors R4 and R5 form a voltage divider of the voltage at node N2 to that at the base of Q2. As the voltage at node N2 increases due to the battery 12, the voltage at Q2 base also increases. This causes the current through R3 to decrease, Since the current through R2 unit remain constant then the current through R1 has to increase. This is done with an increase in voltage at node N1. Thus, when the voltage at N2 rises, so does the voltage at node N1. If the voltage at node N2 decreases due to the battery 12 being discharged, then the voltage at Q2 base decreases. This causes an increase in current through R3, thus the current through R1 must decrease. This is accomplished with a decrease in voltage at node N1.

Figure 3:
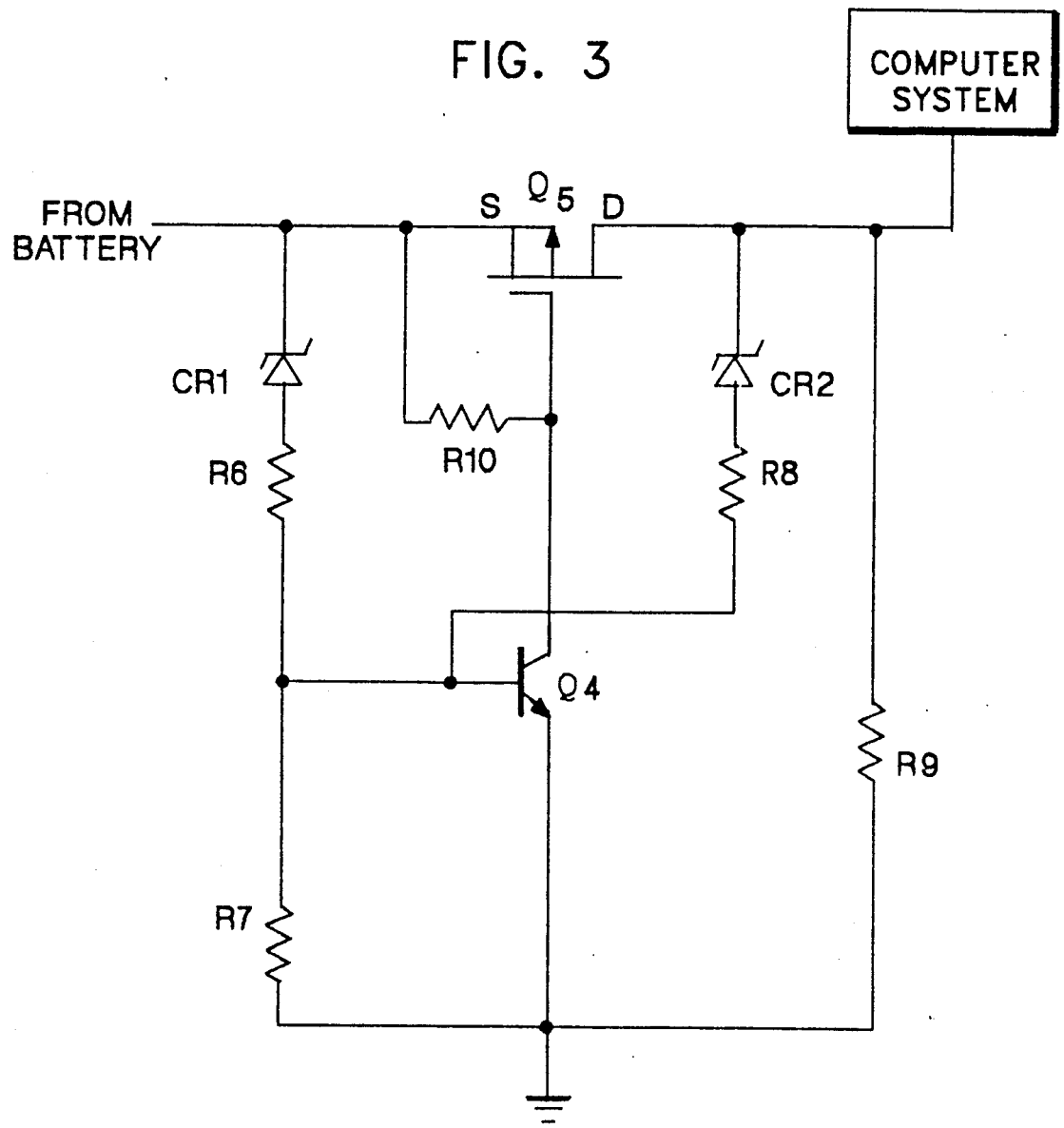
FIG. 3 shows a circuit schematic of the deep discharge prevention circuit.

FIG. 3 shows a circuit diagram for the deep discharge prevention circuit means 15 (FIG. 1.). The function of this circuit is to attach node N2 so that of supplies power to computer system 10, through means 16 when the voltage at node N2 reaches a preset turn-on level and disconnects node N2 when the voltage level drops to a preset on level. By disconnecting node N2 at a selected voltage level from the load, the battery 12 is prevented from deep discharging. To this end, the deep discharge prevention circuit includes FET device Q5 which is controlled to switch when the voltage at node N2 reaches one of two preset levels.

In the preferred embodiment of this invention, Q5 is a P-channel FET device. Likewise, the device switches to its on state and thus connects the battery to the load when the voltage level at N2 is approximately 12.2 volts. This is called the turn-on voltage. Similarly, the FET device Q5 switches to an off state when the voltage at node N2 drops to 11.4 volts. This is called the turn-off voltage. The turn-on voltage is set by zenner diodes CR1 and R6. Likewise, the turn-off voltage is set by zenner diodes CR2 and R8. The gate electrode of FET device Q5 is connected to the collector electrode of Q4. The emitter electrode of Q4 is connected to ground potential. Also R7 is connected from the base electrode of Q4 to ground. R10 ties the source electrode of Q5 to the gate electrode of Q5.

The bi-polar transistor Q4 and R10 provide hysteresis so that once Q5 begins to on, it is forced into its turn-on state. Likewise, when Q5 begins to turn off, it is forced into its off state. It is worthwhile noting that since zenner diodes do not come in 1% steps like resistors, R6 is used is series with CR1 to add the proper voltage from one zenner value to the next. Similarly, R8 is used for the same purpose in series with CR2. Thus, CR1 and R6 are used to control the exact battery voltage at which Q5 turns on. Similarly, CR2 and R8 are used to determine the exact battery voltage at which Q5 turns off. It should be noted that with proper selection of Q5 and the respective voltage setting devices, any load can be switched on/off from a battery or any other DC power source. Also, the switching is done instantaneously due to the latching feature of the circuit. Also, the circuit uses low power, low cost components while having the capability to switch high currents. Also, this circuit does not load the battery when the load is disconnected from it since all active devices are turned off.

While the invention has been particularly shown and described with reference to a preferred embodiment thereof, it will be understood by those skilled in the art that various changes in form and details may be made therein without departing from the spirit and scope of the invention.

What is claimed is:

1. An improved electrical system for providing electrical power to a load comprising:
    a first circuit means for receiving AC voltage signals from an AC supply main and to generate rectified DC voltage signals therefrom;
    a second circuit means responsive to the rectified DC voltage signals and for generating DC voltage signals whose voltage levels are less than the rectified DC voltage signals;
    a third circuit means for further reducing the voltage levels of the DC voltage signals, said third circuit means including a series pass device with an input terminal coupled to an output node (N1) of the second circuit means and another terminal coupled to a first node (N2);
    a fourth circuit means for adjusting the DC voltage at the output node (N1) of the second circuit means relative to the DC voltage at the first node (N2) so that the series pass device consumes a relatively small amount of energy;
    a battery interconnected between the first node (N2) and a ground potential; and
    a fifth circuit means for preventing the battery from deep discharging coupled to said first node (N2).

2. The electrical system of claim 1 further including a sixth circuit means coupled to the fifth circuit means; said sixth circuit means receiving DC voltage signals from said fifth circuit means and reducing said signals to a voltage level which is compatible with said load.

3. The improved electrical system of claim 2 further including a conductive means and an attached connector that mates with a receptacle to connect the first circuit means to the AC supply main.

4. The improved electrical system of claim 1 wherein the second circuit means includes a step down DC—DC converter.

5. The improved electrical system of claim 1 wherein the fourth circuit means includes a switching device, a resistor interconnecting a terminal of said switching device to the output of the second circuit means Node (N1);
    a second resistor interconnecting a control terminal of said switching device to a ground potential; and
    a third resistor coupled to the control terminal and in series with said second resistor; and a diode interconnecting the third resistor to the first Node (N2).

6. The improved electrical system of claim 5 wherein the switching device includes a bipolar transistor.

7. The improved electrical system of claim 1 wherein the fifth circuit means includes an FET device having a source terminal, a drain terminal and a gate terminal;
    a first circuit arrangement for setting a turn-on reference voltage level interconnecting the source terminal and the battery;

a second circuit arrangement for setting a turn-off reference voltage level interconnecting the drain terminal and the load; and a control circuit arrangement coupled to the gate terminal, said control circuit arrangement being responsive to electrical signals generated from the first circuit arrangement or the second circuit arrangement to cause said FET device to turn on or turn off.

8. In a computer installation having a computer system, a regular power supply for providing regular operating power and a battery means for providing auxiliary power, a circuit arrangement for connecting/disconnecting the battery means from said computer system comprising:

a switching means for coupling the battery means to the computer system;

a first threshold means for setting a turn-on reference voltage interconnecting the first switching means to the battery means;

a second threshold means for setting a turn-off reference voltage interconnecting the switching means to the computer system; and a control means coupled to the switching means said control means being operable to monitor the first and the second threshold means and to cause a fast turn-on of said switching means when the turn-on reference voltage level is reached or to cause a fast turn-off of said switching means when the turn-off reference voltage level is reached; said fast turn-on or fast turn-off of said switching means reducing electrical noise in said circuit arrangement.

9. The circuit arrangement of claim 8 wherein the first switching means includes an FET device.

10. The circuit arrangement of claim 9 wherein the first threshold means includes a zenner diode connected in series with a resistor.

11. The circuit arrangement of claim 10 wherein the second threshold means includes a zenner diode connected in series with a resistor.

12. The circuit arrangement of claim 11 wherein the control means includes a bipolar transistor with an emitter electrode coupled to a ground potential, a base electrode coupled to the second threshold means, and a collector electrode coupled to the FET device.

13. The circuit arrangement of claim 12 wherein the control means further includes a first resistor interconnecting the base electrode of said bipolar transistor to the ground potential; and a second resistor interconnecting the collector electrode of the bipolar transistor to a source electrode of the FET device.

* * * * *